DAVID J. MARLEY
ALEXANDER SILVER
INVENTORS.

Jan. 30, 1968    A. SILVER ET AL    3,366,427
SELECTIVELY PRESSURIZED FOIL BEARING ARRANGEMENTS
Filed Nov. 1, 1965                                    2 Sheets-Sheet 2

DAVID J. MARLEY
ALEXANDER SILVER
INVENTORS.

BY Fraser and Bogucki

ATTORNEYS

United States Patent Office 3,366,427
Patented Jan. 30, 1968

3,366,427
SELECTIVELY PRESSURIZED FOIL BEARING ARRANGEMENTS
Alexander Silver, Tarzana, and David John Marley, Buena Park, Calif., assignors to The Garrett Corporation, Los Angeles, Calif., a corporation of California
Filed Nov. 1, 1965, Ser. No. 505,916
11 Claims. (Cl. 308—122)

This invention relates to foil bearings for rotating machinery, and more particularly, to such bearings utilizing a fluid injected into the bearing under pressure during at least a portion of their operating speed range.

One type of bearing which has aroused considerable interest in recent years, particularly for extremely high speed rotating machinery, has been the hydrodynamic foil bearing, sometimes referred to simply as a foil gas bearing. Strictly speaking, hydrodynamic bearings are self-acting or self-pressurizing bearings in which the relative movement of a rotating shaft-and-bush combination develops viscous shear which draws a fluid lubricant in between the bearing surfaces to provide the desired lubrication. It should be noted that such bearings may be designed to use either a liquid or a gaseous lubricant. However, air is commonly used as a lubricant in such bearings particularly where extreme high speed is involved, and, for simplicity, the present invention will be described herein primarily in connection with the use of a gaseous lubricant, such as air or some other suitable gas. In many configurations, the use of one or more foils (i.e., thin metal sheets) extending about the rotating shaft member provides an improved type of high speed bearing. Foil gas bearings per se are inherently subject to a number of problems with respect to various types of instabilities which are likely to develop at various rotational speeds. Such problems are discussed, along with various configurations of gas-lubricated foil bearings of the prior art, in an article entitled "Some Instabilities and Operating Characteristics of High-Speed Gas-Lubricated Journal Bearings," by K. Fischer et al., ASME Paper 58A-231. Although the article discusses various problems mainly relating to limitations on high speed bearing operation, it fails to point to any ready solution to these problems, nor does it treat the problems which are encountered in operating gas bearings at low speeds such as are encountered during startup and coastdown or in starting from rest condition (zero r.p.m.). Proper control or elimination of high speed instabilities will permit the bearing to operate to the burst speed of the rotating assembly, typically approaching the speed of one million r.p.m. or more.

In many cases, the hydrodynamic gas bearing is incapable of carrying the normal dynamic bearing loads at low speeds or during startup and coastdown. This is understandable, since in a typical hydrodynamic gas bearing, suitable lubrication of the bearing surfaces depends upon the effect of viscous shear which draws air in between the bearing surfaces which are loaded by the bearing load. As soon as the relative rotation of the bearing surfaces drops below some minimum level, the lubricating gas is no longer drawn into the region between the loaded bearing surfaces and the surfaces come into contact and may suffer damage to the bearing surfaces by scoring or overheating or at the very least increased drag. Moreover, during startup from rest, there is oftentimes insufficient torque available to overcome the substantially greater static friction encountered at rest. It should be noted that the very high speed turbines or other motors with which foil gas bearings are employed typically generate a very low starting torque so that it becomes essential to reduce the friction load of the bearing to a very low value at startup. Once sufficient rotational speed is reached, of course, the lubricating gas is drawn into the bearing by the viscous shear effect and bearing drag is maintained at a very low value. In most cases the bearing load must be removed completely or materially reduced when there is any danger of the bearing operating with the movable surfaces in direct contact with each other. The provision of various foil configurations within the bearing may tend to alleviate the situation just described, but it is still generally true that prior art hydrodynamic gas bearings, even those which employ foils within the bearing configuration, are undesirably limited in the load carrying capabilities at lower speed ranges for the reasons just discussed, as well as being subject to problems of the type described at high speed ranges.

Accordingly, it is an object of the present invention to provide an improved configuration for a foil gas bearing which improves its load carrying capabilities.

More particularly, it is an object of the present invention to provide a foil gas bearing having improved load carrying capabilities at low speed ranges.

It is the further object of the present invention to provide a hydrodynamic gas bearing structure having improved load carrying capabilities during startup and coastdown in the vicinity of the stopped or stationary condition.

It is the further object of the present invention to provide a foil gas bearing configuration which is pressurized at selected speed ranges.

More specifically, it is an object of the present invention to provide an arrangement for automatically pressurizing a foil gas bearing at a selected speed range while cutting off the pressurization at a speed range different from the selected speed range.

In particular, it is an object of the present invention to provide an arrangement for automatically pressurizing a foil gas bearing when pressurized lubrication is required.

In brief, particular arrangements in accordance with the invention may comprise a journal bearing mounted to enclose a rotatable shaft with a plurality of foils positioned between the shaft and the interior surface of the bearing and affixed in position by attachment to the bearing housing. The foils which are so positioned are thin, flexible sheets having a thickness relative to other dimensions such that the sheets may be readily deflected by hydrodynamic film forces between adjacent bearing surfaces and the foil. The individual foils preferably extend through approximately 180° about the shaft in the direction of shaft rotation and are interleaved in the manner of shingles so that each proceeds from a point adjacent the interior surface of the bearing housing to a point adjacent the surface of the rotatable shaft. However, the extent of encirclement is not critical and the foils may extend 90° or 120° for example with salutary effect. At normal operating speeds, air is drawn into the region between the foils and the shaft to provide a lubrication medium in the form of an air film. In addition, however, special arrangements are provided for directing air into the foil region under pressure when the bearing is operating in a selected speed range. Thus pressurized air may be injected in order to provide a lubricating film within the bearing at speeds below the range in which air is drawn into the foil region by the viscous shear effect. In this way, the bearing is operated hydrostatically during startup and coastdown or any other operation in its low speed range. Similarly, air may be injected under pressure between the outer foil surface and the bushing to stiffen the bearing at high operating speeds, thus improving the stability and increasing the upper limit of its operating capability. In accordance with one particular aspect of the invention a source of pressurized air is coupled to the bearing via a valve which is controlled by a tachometer coupled to the rotatable shaft. This permits air to be hydrostatically directed into the bearing between the shaft and the foils when the shaft is rotating at low speed (below a selected threshold speed) but cuts off the air once the shaft reaches an operating speed at which an adequate lubricating air film is drawn into the bearing by viscous shear. By virtue of another aspect of the invention, air may be injected from a similar arrangement to the outer foil surface region at speeds above some predetermined level.

In one particular arrangement in accordance with the invention, the bearing housing is provided with a number of holes extending therethrough and surrounded by a pressure collar or plenum into which air may be directed under pressure so as to flow through the holes into the interior of the bearing in the vicinity of the outer foil region. The bearing housing is also provided with a number of interior slots, axially directed, in which beads which are welded or otherwise attached to the individual foils may be recessed so as to retain the foils in position against rotation with the rotatable shaft.

In another particular arrangement in accordance with the invention, a hollow shaft is provided for the rotating member having a plurality of distributing holes or channels extending radially from the hollow core to the outer surface of the shaft. In this arrangement, a lubricating fluid, such as air, enters the center of the shaft through an opening at its end (or through other openings communicating therewith) and then is directed outwardly through the distributing holes which extend in radial direction to the foil regions surrounding the shaft. In accordance with a further aspect of the invention, the foils may be arranged to comprise alternate sheets of metal foil and plastic foil such as Teflon. The interleaving of Teflon sheets with the metal foils advantageously serves to reduce metal-to-metal contact and also develops a dry lubricant film on all metal surfaces, thereby enhancing the operating characteristics of the bearing during startup or low speed operation. The plastic sheets also materially improve the ability of the bearing to withstand momentary overloads at high speeds. The plastic sheets may be readily held in position in the bearing by partially rolling one end of the sheet about a small rod which is positioned within a slot in the interior face of the bearing housing.

A better understanding of the invention may be had from a consideration of the following detailed description, taken in conjunction with the accompanying drawings, wherein.

Figure 1:
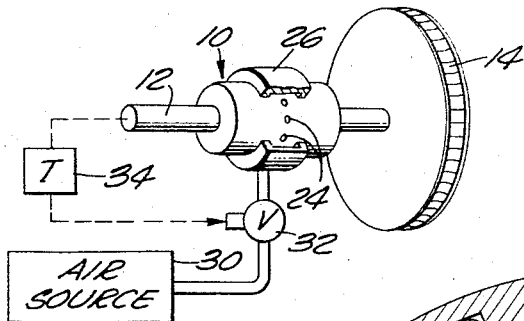
FIG. 1 is a schematic representation of one particular bearing arrangement in accordance with the invention.
Figure 2:
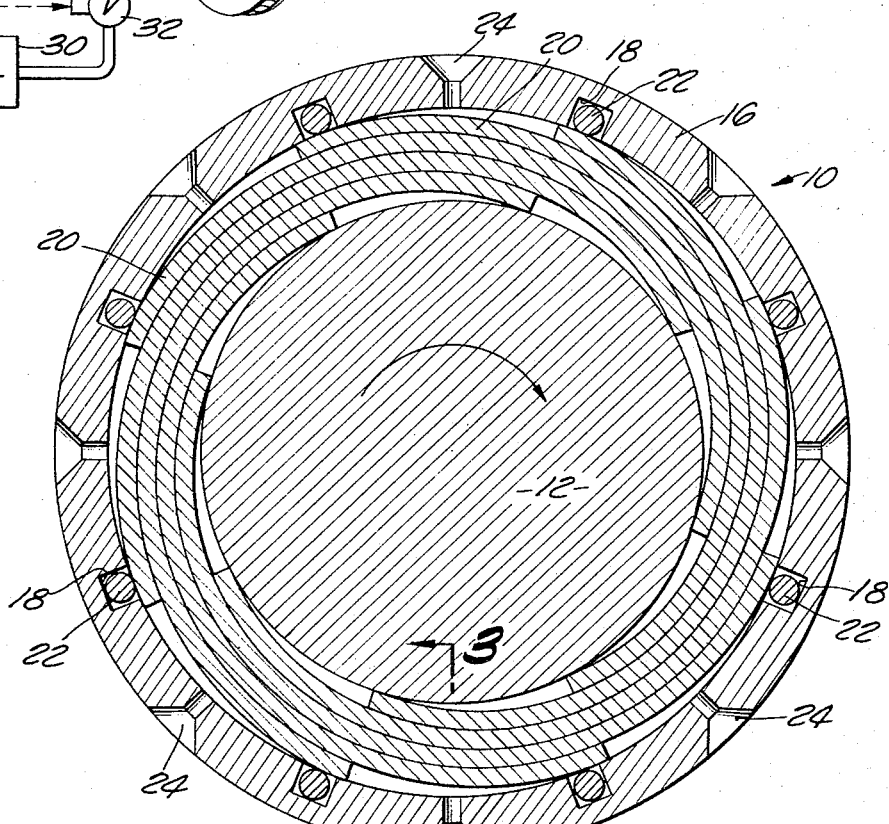
FIG. 2 is an enlarged end sectional view of the arrangement shown in FIG. 1.
Figure 3:
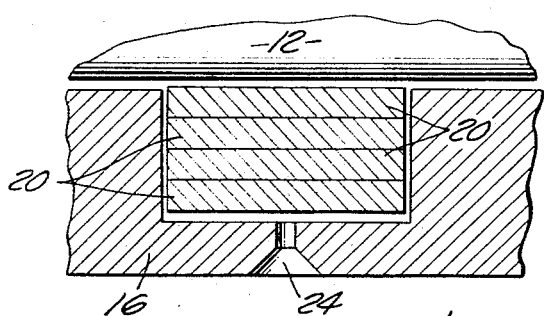
FIG. 3 is a cross-sectional view taken along the line 3—3 of FIG. 2 and looking in the direction of the arrows.

In FIG. 1, one particular arrangement in accordance with the invention is shown comprising a bearing 10 positioned about a shaft 12 which is coupled to a turbine wheel 14 as an example. As shown in further detail in FIGS. 2 and 3, the bearing 10 comprises a housing 16 enclosing a plurality of foils 20 which are positioned between the housing 16 and the shaft 12 (it will be understood, of course, that the dimensions of the regions between the shaft 12 and the bearing housing 16 are greatly exaggerated in order to show the foils in greater detail). Each foil 20 is provided with a bead 22 at its outer end which may be affixed thereto by welding, for example, for the purpose of mounting the foil in position. The housing 16 is provided with a plurality of slots 18 arranged about the interior of the housing 16 for receiving the beads 22 which are affixed to the foils 20. Thus, each foil is retained in position against the tendency to rotate with the rotatable shaft 12 which in this view is designed to rotate in a clockwise direction. Each individual foil 20 extends in a clockwise direction about the shaft 12 beginning with the bead 22 and it is interleaved underneath the adjacent foil 20 proceeding in the direction of rotation of the shaft 12.

The bearing housing 16 is also provided about its periphery with a plurality of holes 24 which extend in a radial direction through the bearing housing 16. The holes 24 are provided for the purpose of admitting air or other fluid under pressure from an external air source in order to stiffen the bearing for improved stability in a high speed range. As shown in FIG. 1, this is coupled to the holes 24 by way of a pressure collar 26 which extends about the bearing 10 in the region of the holes 24. Suitable piping is provided to couple an air source 30 to the pressure collar 26 via a valve 32. As shown, the valve 32 is responsive to control from a tachometer 34 which is mechanically or otherwise coupled to the shaft 12 in order to sense the rotating speed thereof. By virtue of this arrangement, valve 32 is maintained closed when the bearing is operating below the high speed range in which stiffening to improve stability is desired. When rotational speed reaches a predetermined level, as sensed by the tachometer 34, air is directed through the valve 32 from the air source 30 to the pressure collar 26, thence through the holes 24 to the outer foil region of the bearing where it stiffens the entire foil assembly and stabilizes the bearing for operation at increased speeds. During coastdown, as shaft speed reduces, the pressurized stiffening is no longer needed and the valve 32 is closed under the control of the tachometer 34 so as to avoid increased friction and drag at lower speeds.

Figure 4:
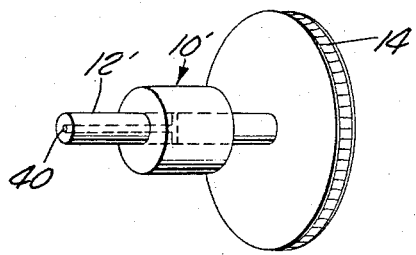
FIG. 4 is a schematic representation of a second particular arrangement in accordance with the invention.
Figure 5:
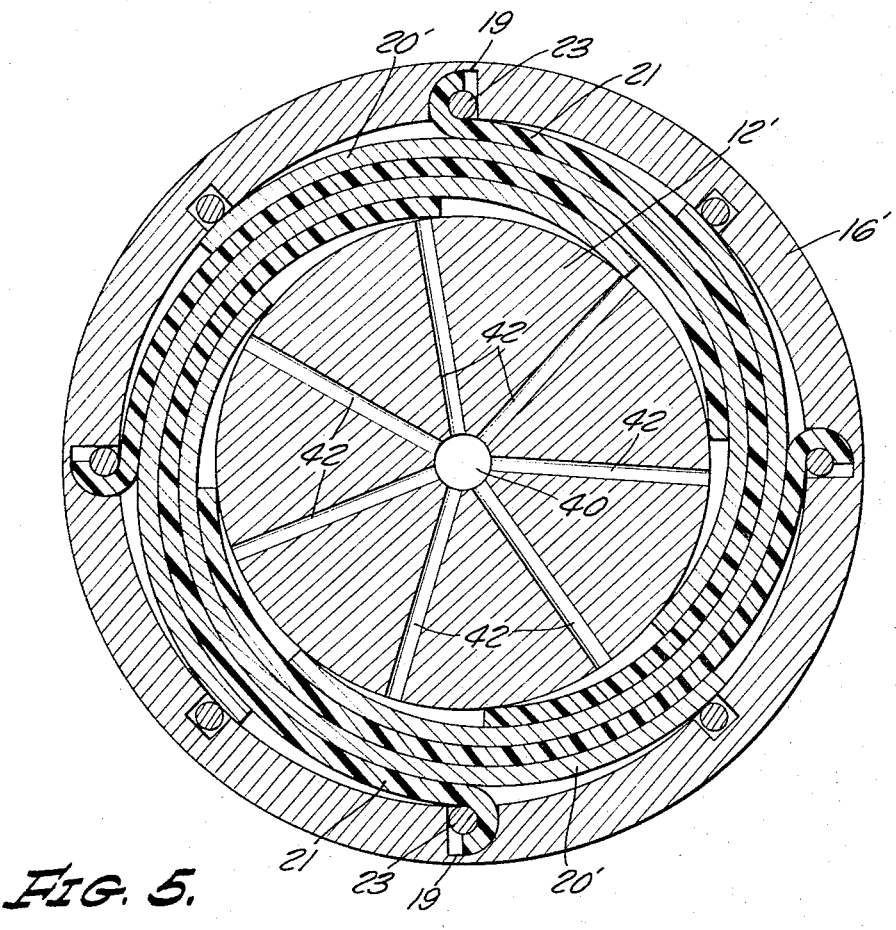
FIG. 5 is an end sectional view of the arrangement shown in FIG. 4.

A second particular arrangement in accordance with the invention is shown in FIGS. 4 and 5 and it comprises a bearing 10' extending about a shaft 12', again shown coupled to a turbine wheel 14. The shaft 12' is shown provided with a central aperture or core 40 with which a plurality of radially directed channels 42 communicate. These channels 42 extend outwardly from the central aperture 40 to the surface of the shaft 12' and serve to inject pressurized air to develop a desired hydrostatic pressure at low rational speeds of the shaft 12'. This arrangement may be coupled, in a fashion similar to that shown in FIG. 1 to the appropriate air source-valve-tachometer combination which operates to provide automatic cut-off of the hydrostatic lubrication action as soon as the shaft 12' reaches an operating speed at which pressurized lubrication is no longer needed. In this arrangement, however, the tachometer 34 is operative to control the valve 32 to cut off air to the shaft opening 40 when rotational speed increases above a predetermined level where hydrostatic lubrication is no longer needed and to admit air to the shaft opening 40 during coastdown when viscous shear is no longer effective.

As an alternative, if desired, the valve 32 may be manually operated (thus dispensing with the use of the tachometer 34) to pressurize the bearing 10 momentarily for startup operation. The air introduced in this fashion is sufficient to provide the desired lubricating film, since it does not bleed off until the bearing 10' has reached the speed range of hydrodynamic operation.

As the arrangement of FIGS. 4 and 5 is depicted, the foil region is shown comprising a plurality of interleaved sheets of metal foil 20' and plastic sheets 21, the latter of which may desirably be fabricated of polytetrafluoroethylene which is commonly known by the tradename Teflon or some similar material. The plastic sheets are held in position by a small rod 23 about which the end of the sheet is partially wrapped, after which the rod 23 is inserted in a slot 19 of the bearing housing 16'.

By virtue of the above described arrangements in accordance with the invention, improved operation is achieved both in the high speed range by substantial reduction or complete elimination of half-frequency whirl and other bearing instabilities formerly considered inherent in gas lubricated bearings, and in the low speed range during startup or coast down by virtue of the automatic control mechanisms which supply pressurized fluid to appropriate regions of the foil gas bearing as needed in the respective speed ranges. In addition, the resilient pads which may be incorporated with the metal foils reduce metal-to-metal contact and provide an additional lubricating film, thus further improved the low speed load carrying cabilities, even without external pressurization.

Although the present invention has been disclosed in the context of journal bearing configurations, it will be understood that the novel aspects of the invention may be practiced as well with thrust bearings or conical bearings utilizing foils as bearing surfaces. Accordingly, the invention will be understood to extend to all such configurations making use of the principles of the invention.

Although there have been shown and described hereinabove various particular arrangements of a foil gas bearing in accordance with the invention for the purpose of illustrating the preferred embodiments thereof, it will be understood that the invention is not intended to be limited thereto. Accordingly, any and all modifications, variations or equivalent arrangements falling within the scope of the annexed claims should be considered to be a part of the invention.

What is claimed is:

1. A foil bearing device comprising a plurality of foils interleaved together about a shaft to form a bearing, a bearing housing encasing said foils, means affixing at least some of said foils to said housing, and means for automatically injecting fluid into the region of said interleaved foils within a selected speed range of rotation of said shaft and for cutting off said fluid from said region for shaft rotation outside of said range.

2. A device in accordance with claim 1 wherein said last-mentioned means comprises a device coupled to said shaft to sense the rotational speed thereof and a valve connected to the fluid injecting means and coupled to be responsive to said rotational speed sensing means.

3. A device in accordance with claim 1 wherein said fluid comprises a pressurized gas.

4. A device in accordance with claim 1 wherein said fluid injecting means comprises at least one opening in said housing and means for injecting fluid under pressure through said opening to the region between said foils and said housing to stiffen the bearing at operating speeds above a predetermined threshold.

5. A device in accordance with claim 1 wherein said fluid injecting means comprises an opening in said shaft having at least a radial component thereof connecting with the outer surface of the shaft and means for injecting fluid under pressure to the region between the shaft and the foils to provide hydrostatic lubrication for rotation below a predetermined speed.

6. A device in accordance with claim 5 further including means for automatically cutting off the injection of fluid into the foil region when the rotating shaft reaches said predetermined speed.

7. A device in accordance with claim 1 wherein said foils comprise at least one metal foil interleaved with at least one plastic sheet about said shaft.

8. A device in accordance with claim 7 wherein the plurality of foils comprises approximately half metallic foils and half plastic sheets alternately interleaved with each other.

9. A device in accordance with claim 8 wherein said plastic foils comprise polytetrafluoroethylene material.

10. A device in accordance with claim 1 wherein the means for affixing said foils to said housing comprise a plurality of longitudinal slots in said housing, one for each foil, and a bead affixed near one end of a foil and adapted to fit within a corresponding one of said slots.

11. A device in accordance with claim 10 wherein said foils comprise plastic and metal sheets alternately interleaved, and wherein the means for affixing said foils to said housing comprises a rod about which the outer end of the plastic foil is wound with the rod and the outer end of the plastic foil being inserted together in the corresponding slot of said housing.

References Cited

UNITED STATES PATENTS 2,937,294 5/1960 Mocks.
3,215,480 11/1965 Morley _____ 308—121

MARTIN P. SCHWADRON, *Primary Examiner.*

FRANK SUSKO, *Examiner.*